(12) United States Patent
Diehl et al.

(10) Patent No.: US 10,940,339 B2
(45) Date of Patent: Mar. 9, 2021

(54) ENERGY ABSORBING APPARATUS

(71) Applicant: Eddy Current Limited Partnership, Wellington (NZ)

(72) Inventors: Andrew Karl Diehl, Wellington (NZ); Dave Walters, Wellington (NZ)

(73) Assignee: EDDY CURRENT LIMITED PARTNERSHIP, Wellington (NZ)

( * ) Notice: Subject to any disclaimer, the term of this patent is extended or adjusted under 35 U.S.C. 154(b) by 298 days.

(21) Appl. No.: 15/532,977

(22) PCT Filed: Dec. 4, 2015

(86) PCT No.: PCT/NZ2015/050209
§ 371 (c)(1),
(2) Date: Jun. 2, 2017

(87) PCT Pub. No.: WO2016/089229
PCT Pub. Date: Jun. 9, 2016

(65) Prior Publication Data
US 2018/0264296 A1  Sep. 20, 2018

(30) Foreign Application Priority Data
Dec. 4, 2014 (NZ) ........................ 701551

(51) Int. Cl.
| | |
|---|---|
| *A62B 35/04* | (2006.01) |
| *F16F 7/12* | (2006.01) |
| *A62B 35/00* | (2006.01) |
| *A62B 1/10* | (2006.01) |
| *F16F 7/04* | (2006.01) |

(52) U.S. Cl.
CPC .......... *A62B 35/04* (2013.01); *A62B 35/0093* (2013.01); *F16F 7/12* (2013.01); *A62B 1/10* (2013.01); *F16F 7/04* (2013.01)

(58) Field of Classification Search
CPC ....... A62B 35/04; A62B 35/0093; A62B 1/10; F16F 7/04; F16F 7/12
See application file for complete search history.

(56) References Cited

U.S. PATENT DOCUMENTS

| | | | |
|---|---|---|---|
| 2,058,024 | A | 10/1936 | Logan, Jr. |
| 2,122,312 | A | 6/1938 | Cassion |
| 2,122,315 | A | 6/1938 | Fosty et al. |

(Continued)

FOREIGN PATENT DOCUMENTS

| | | |
|---|---|---|
| CN | 1783674 A | 6/2006 |
| CN | 101820952 A | 9/2010 |

(Continued)

OTHER PUBLICATIONS

Extended European Search Report, dated Mar. 29, 2018, for European Application No. 15834380.6-1201, 12 pages.

(Continued)

*Primary Examiner* — Sang K Kim
(74) *Attorney, Agent, or Firm* — Seed Intellectual Property Law Group LLP

(57) ABSTRACT

Described herein are energy absorbing apparatuses and methods of their use that utilize varying energy absorbing relationships between the apparatus members to absorb an energy input. The energy absorbing process occurs via a material forming process.

16 Claims, 3 Drawing Sheets

(56) References Cited

U.S. PATENT DOCUMENTS

| | | |
|---|---|---|
| 2,272,509 A | 2/1942 | Cavallo |
| 2,409,009 A | 10/1946 | Bakke |
| 2,428,104 A | 9/1947 | Winther |
| 2,437,871 A | 3/1948 | Wood |
| 2,492,776 A | 12/1949 | Winther |
| 2,771,171 A | 11/1956 | Schultz |
| 2,807,734 A | 9/1957 | Lehde |
| 3,364,795 A | 1/1968 | De Coye De Castelet |
| 3,447,006 A | 5/1969 | Bair |
| 3,721,394 A | 3/1973 | Reiser |
| 3,868,005 A | 2/1975 | McMillan |
| 3,934,446 A * | 1/1976 | Avitzur .................. B21B 1/16 72/206 |
| 3,962,595 A | 6/1976 | Eddens |
| 3,967,794 A | 7/1976 | Fohl |
| 4,078,719 A | 3/1978 | Durland et al. |
| 4,093,186 A | 6/1978 | Golden |
| 4,224,545 A | 9/1980 | Powell |
| 4,271,944 A | 6/1981 | Hanson |
| 4,306,688 A | 12/1981 | Hechler, IV |
| 4,416,430 A | 11/1983 | Totten |
| 4,434,971 A | 3/1984 | Cordrey |
| 4,544,111 A | 10/1985 | Nakajima |
| 4,561,605 A | 12/1985 | Nakajima |
| 4,567,963 A | 2/1986 | Sugimoto |
| 4,612,469 A | 9/1986 | Muramatsu |
| 4,676,452 A | 6/1987 | Nakajima |
| 4,690,066 A | 9/1987 | Morishita et al. |
| 4,729,525 A | 3/1988 | Rumpf |
| 4,826,150 A | 5/1989 | Minoura |
| 4,846,313 A | 7/1989 | Sharp |
| 4,895,317 A | 1/1990 | Rumpf et al. |
| 4,938,435 A | 7/1990 | Varner et al. |
| 4,957,644 A | 9/1990 | Price et al. |
| 4,974,706 A | 12/1990 | Maji et al. |
| 5,054,587 A | 10/1991 | Matsui et al. |
| 5,064,029 A | 11/1991 | Araki et al. |
| 5,084,640 A | 1/1992 | Morris et al. |
| 5,205,386 A | 4/1993 | Goodman et al. |
| 5,248,133 A | 9/1993 | Okamoto et al. |
| 5,272,938 A | 12/1993 | Hsu et al. |
| 5,342,000 A | 8/1994 | Berges et al. |
| 5,392,881 A | 2/1995 | Cho et al. |
| 5,441,137 A | 8/1995 | Organek et al. |
| 5,465,815 A | 11/1995 | Ikegami |
| 5,477,093 A | 12/1995 | Lamb |
| 5,483,849 A | 1/1996 | Orii et al. |
| 5,495,131 A | 2/1996 | Goldie et al. |
| 5,636,804 A | 6/1997 | Jeung |
| 5,692,693 A | 12/1997 | Yamaguchi |
| 5,711,404 A | 1/1998 | Lee |
| 5,712,520 A | 1/1998 | Lamb |
| 5,722,612 A | 3/1998 | Feathers |
| 5,742,986 A | 4/1998 | Corrion et al. |
| 5,779,178 A | 7/1998 | McCarty |
| 5,791,584 A | 8/1998 | Kuroiwa |
| 5,822,874 A | 10/1998 | Nemes |
| 5,862,891 A | 1/1999 | Kröger et al. |
| 5,928,300 A | 7/1999 | Rogers et al. |
| 6,041,897 A | 3/2000 | Saumweber et al. |
| 6,042,517 A | 3/2000 | Gunther et al. |
| 6,051,897 A | 4/2000 | Wissler et al. |
| 6,062,350 A | 5/2000 | Spieldiener et al. |
| 6,086,005 A | 7/2000 | Kobayashi et al. |
| 6,209,688 B1 | 4/2001 | Kuwahara |
| 6,220,403 B1 | 4/2001 | Kobayashi et al. |
| 6,279,682 B1 | 8/2001 | Feathers |
| 6,293,376 B1 | 9/2001 | Pribonic |
| 6,412,611 B1 | 7/2002 | Pribonic |
| 6,460,828 B1 | 10/2002 | Gersemsky et al. |
| 6,466,119 B1 | 10/2002 | Drew |
| 6,523,650 B1 | 2/2003 | Pribonic et al. |
| 6,533,083 B1 | 3/2003 | Pribonic et al. |
| 6,557,673 B1 | 5/2003 | Desta et al. |
| 6,561,451 B1 | 5/2003 | Steinich |
| 6,659,237 B1 | 12/2003 | Pribonic |
| 6,756,870 B2 | 6/2004 | Kuwahara |
| 6,793,203 B2 | 9/2004 | Heinrichs et al. |
| 6,810,997 B2 | 11/2004 | Schreiber et al. |
| 6,918,469 B1 | 7/2005 | Pribonic et al. |
| 6,962,235 B2 | 11/2005 | Leon |
| 6,973,999 B2 | 12/2005 | Ikuta et al. |
| 7,011,607 B2 | 3/2006 | Kolda et al. |
| 7,014,026 B2 | 3/2006 | Drussel et al. |
| 7,018,324 B1 | 3/2006 | Lin |
| 7,279,055 B2 | 10/2007 | Schuler |
| 7,281,612 B2 | 10/2007 | Hsieh |
| 7,281,620 B2 | 10/2007 | Wolner et al. |
| 7,513,334 B2 | 4/2009 | Calver |
| 7,528,514 B2 | 5/2009 | Cruz et al. |
| 7,984,796 B2 | 7/2011 | Pribonic |
| 8,037,978 B1 | 10/2011 | Boren |
| 8,272,476 B2 | 9/2012 | Hartman et al. |
| 8,424,460 B2 | 4/2013 | Lerner et al. |
| 8,490,751 B2 | 7/2013 | Allington et al. |
| 8,511,434 B2 | 8/2013 | Blomberg |
| 8,556,234 B2 | 10/2013 | Hartman et al. |
| 8,567,561 B2 | 10/2013 | Strasser et al. |
| 8,601,951 B2 | 12/2013 | Lerner |
| 8,851,235 B2 | 10/2014 | Allington et al. |
| 9,016,435 B2 | 4/2015 | Allington et al. |
| 9,199,103 B2 | 12/2015 | Hetrich et al. |
| 9,242,128 B2 | 1/2016 | Macy |
| 2002/0162477 A1 | 11/2002 | Palumbo |
| 2002/0179372 A1 | 12/2002 | Schreiber et al. |
| 2003/0116391 A1 | 6/2003 | Desta et al. |
| 2003/0168911 A1 | 9/2003 | Anwar |
| 2003/0211914 A1 | 11/2003 | Perkins et al. |
| 2004/0055836 A1 | 3/2004 | Pribonic et al. |
| 2004/0073346 A1 | 4/2004 | Roelleke |
| 2004/0168855 A1 | 9/2004 | Leon |
| 2004/0191401 A1 | 9/2004 | Bytnar et al. |
| 2005/0051659 A1 | 3/2005 | Wolner et al. |
| 2005/0082410 A1 | 4/2005 | Tanaka et al. |
| 2005/0117258 A1 | 6/2005 | Ohta et al. |
| 2005/0189830 A1 | 9/2005 | Corbin, III et al. |
| 2005/0263356 A1 | 12/2005 | Marzano et al. |
| 2006/0219498 A1 | 10/2006 | Organek et al. |
| 2006/0278478 A1 | 12/2006 | Pribonic et al. |
| 2007/0000741 A1 | 1/2007 | Pribonic et al. |
| 2007/0001048 A1 | 1/2007 | Wooster et al. |
| 2007/0135561 A1 | 6/2007 | Rath et al. |
| 2007/0228202 A1 | 10/2007 | Scharf et al. |
| 2007/0228713 A1 | 10/2007 | Takemura |
| 2007/0256906 A1 | 11/2007 | Jin et al. |
| 2008/0059028 A1 | 3/2008 | Willerton |
| 2008/0074223 A1 | 3/2008 | Pribonic |
| 2008/0087510 A1 | 4/2008 | Pribonic |
| 2008/0105503 A1 | 5/2008 | Pribonic |
| 2008/0106420 A1 | 5/2008 | Rohlf |
| 2008/0135579 A1 | 6/2008 | Bertram et al. |
| 2009/0026303 A1 | 1/2009 | Schmitz et al. |
| 2009/0032785 A1 | 2/2009 | Jones |
| 2009/0084883 A1 | 4/2009 | Casebolt et al. |
| 2009/0114892 A1 | 5/2009 | Lesko |
| 2009/0166459 A1 | 7/2009 | Niitsuma et al. |
| 2009/0178887 A1 | 7/2009 | Reeves et al. |
| 2009/0211846 A1 | 8/2009 | Taylor |
| 2009/0319212 A1 | 12/2009 | Cech et al. |
| 2010/0032255 A1 | 2/2010 | Conti et al. |
| 2010/0065373 A1 | 3/2010 | Stone et al. |
| 2010/0112224 A1 | 5/2010 | Lott |
| 2010/0116922 A1 | 5/2010 | Choate et al. |
| 2010/0211239 A1 | 8/2010 | Christensen et al. |
| 2011/0084158 A1 | 4/2011 | Meillet et al. |
| 2011/0114907 A1 | 5/2011 | Hartman et al. |
| 2011/0147125 A1 | 6/2011 | Blomberg |
| 2011/0166744 A1 | 7/2011 | Lu et al. |
| 2011/0174914 A1 | 7/2011 | Yang |
| 2011/0175473 A1 | 7/2011 | Kitabatake et al. |
| 2011/0240403 A1 | 10/2011 | Meillet |
| 2011/0297778 A1 | 12/2011 | Meillet et al. |
| 2012/0055740 A1 | 3/2012 | Allington et al. |
| 2012/0118670 A1 | 5/2012 | Olson et al. |

(56) References Cited

U.S. PATENT DOCUMENTS

| | | |
|---|---|---|
| 2012/0312540 A1 | 12/2012 | Lefebvre |
| 2013/0048422 A1 | 2/2013 | Hartman et al. |
| 2013/0087433 A1 | 4/2013 | Sejourne |
| 2013/0118842 A1 | 5/2013 | Lerner |
| 2013/0186721 A1 | 7/2013 | Bogdanowicz et al. |
| 2014/0048639 A1 | 2/2014 | Allington et al. |
| 2014/0110947 A1 | 4/2014 | Mongeau |
| 2014/0224597 A1 | 8/2014 | Takezawa et al. |
| 2014/0346909 A1 | 11/2014 | Vogler et al. |
| 2014/0375158 A1 | 12/2014 | Allington et al. |
| 2015/0196820 A1 | 7/2015 | Allington et al. |
| 2015/0266454 A1 | 9/2015 | McGowan |
| 2015/0352380 A1 | 12/2015 | Huang et al. |
| 2016/0052401 A1 | 2/2016 | McGowan et al. |
| 2016/0317936 A1 | 11/2016 | Diehl et al. |
| 2016/0360738 A1 | 12/2016 | Richardson |
| 2017/0237313 A1 | 8/2017 | Diehl et al. |
| 2017/0244313 A1 | 8/2017 | Diehl et al. |
| 2017/0274261 A1 | 9/2017 | Allington et al. |
| 2017/0328424 A1 | 11/2017 | Allington et al. |
| 2017/0338728 A1 | 11/2017 | Diehl et al. |
| 2018/0245658 A1 | 8/2018 | Diehl et al. |
| 2018/0269767 A1 | 9/2018 | Diehl et al. |
| 2018/0269768 A1 | 9/2018 | Diehl et al. |
| 2018/0269769 A1 | 9/2018 | Allington et al. |
| 2018/0370484 A1 | 12/2018 | Diehl et al. |

FOREIGN PATENT DOCUMENTS

| | | |
|---|---|---|
| CN | 202203305 U | 4/2012 |
| CN | 102497085 A | 6/2012 |
| CN | 102627063 A | 8/2012 |
| CN | 103244577 A | 8/2013 |
| CN | 103326538 A | 9/2013 |
| DE | 93 00 966 U1 | 3/1993 |
| DE | 10 2005 032 694 A1 | 1/2007 |
| EP | 0 247 818 A2 | 2/1987 |
| EP | 0 460 494 A1 | 12/1991 |
| EP | 0 909 684 A2 | 4/1999 |
| EP | 1 094 240 A2 | 4/2001 |
| EP | 1 401 087 A1 | 3/2004 |
| EP | 1 432 101 A1 | 6/2004 |
| EP | 1 480 320 A1 | 11/2004 |
| EP | 1 564 868 A1 | 8/2005 |
| EP | 1 244 565 B1 | 7/2006 |
| GB | 721748 A | 1/1955 |
| GB | 908128 A | 10/1962 |
| GB | 2 340 461 A | 2/2000 |
| GB | 2 352 644 A | 2/2001 |
| GB | 2 352 645 A | 2/2001 |
| GB | 2 352 784 A | 2/2001 |
| GB | 2 357 563 A | 6/2001 |
| JP | 49-097163 A | 9/1974 |
| JP | S53-113528 U | 9/1978 |
| JP | 56-107092 | 8/1981 |
| JP | 58/25152 U | 2/1983 |
| JP | 60-259278 A | 12/1985 |
| JP | 63-64542 A | 3/1988 |
| JP | H05-72684 A | 3/1993 |
| JP | 5-296287 A | 11/1993 |
| JP | H05-84347 U | 11/1993 |
| JP | 8-252025 A | 10/1996 |
| JP | 10-98868 A | 4/1998 |
| JP | 10-140536 A | 5/1998 |
| JP | H10-178717 A | 6/1998 |
| JP | 10-304799 A | 11/1998 |
| JP | 11-119680 A | 4/1999 |
| JP | 11-189701 A | 7/1999 |
| JP | 11-315662 A | 11/1999 |
| JP | 2000-189530 A | 7/2000 |
| JP | 2000-316272 A | 11/2000 |
| JP | 2001-17041 A | 1/2001 |
| JP | 2005-353123 A | 12/2005 |
| JP | 2012-152316 A | 8/2012 |
| RU | 106 462 U1 | 7/2011 |
| WO | 95/16496 A1 | 6/1995 |
| WO | 96/17149 A1 | 6/1996 |
| WO | 98/47215 A1 | 10/1998 |
| WO | 01/38123 A1 | 5/2001 |
| WO | 03/055560 A1 | 7/2003 |
| WO | 2007/060053 A1 | 5/2007 |
| WO | 2008/139127 A1 | 11/2008 |
| WO | 2009/013479 A1 | 1/2009 |
| WO | 2009/047469 A1 | 4/2009 |
| WO | 2009/108040 A1 | 9/2009 |
| WO | 2009/127142 A1 | 10/2009 |
| WO | 2010/104405 A2 | 9/2010 |

OTHER PUBLICATIONS

Extended European Search Report, dated Apr. 6, 2018, for European Application No. 15864540.8-1201, 26 pages.

Park et al., "Torque analysis and measurements of a permanent magnet type Eddy current brake with a Halbach magnet array based on analytical magnetic field calculations," *Journal of Applied Physics* 115(17):17E707, 2014. (3 pages).

International Search Report and Written Opinion, dated Apr. 1, 2016, for International Application No. PCT/NZ2015/050206, 9 pages.

International Search Report and Written Opinion, dated Feb. 13, 2009, for International Application No. PCT/US2008/087863, 15 pages.

International Search Report and Written Opinion, dated Feb. 23, 2011, for International Application No. PCT/NZ2010/000011, 10 pages.

International Search Report and Written Opinion, dated Feb. 24, 2016, for International Application No. PCT/NZ2015/050207, 10 pages.

International Search Report and Written Opinion, dated Jan. 29, 2016, for International Application No. PCT/NZ2015/050208, 11 pages.

International Search Report and Written Opinion, dated Mar. 11, 2015, for International Application No. PCT/NZ2014/000245, 8 pages.

International Search Report and Written Opinion, dated Mar. 18, 2016, for International Application No. PCT/NZ2015/050209, 14 pages.

International Search Report and Written Opinion, dated Mar. 29, 2016, for International Application No. PCT/NZ2015/050205, 10 pages.

International Search Report and Written Opinion, dated Nov. 11, 2015, for International Application No. PCT/NZ2015/050114, 10 pages.

International Search Report and Written Opinion, dated Nov. 18, 2015, for International Application No. PCT/NZ2015/050113, 9 pages.

International Search Report and Written Opinion, dated Oct. 26, 2015, for International Application No. PCT/NZ2015/050115, 10 pages.

MSA Safety Incorporated, Auto Belay Stop Use Notice, Oct. 15, 2009, URL=http://verticalendeavors.com/minneapolis/auto-belay-stop-us-notice/, download date Apr. 6, 2017, 2 pages.

North Safety Products Europe B.V., "Climbing Wall Descender: FP2/5**GDD," *Climbing Wall Descent Controllers Instruction Manual* v3, Aug. 18, 2008, 20 pages.

TRUBLUE Auto Belays, Model TB150-12C Operator Manual, Jun. 20, 2013, 37 pages.

Final Office Action, dated Feb. 28, 2017, for U.S. Appl. No. 14/464,255, Allington et al., "Braking Mechanisms," 10 pages.

Notice of Allowance, dated Jul. 21, 2014, for U.S. Appl. No. 13/255,625, Allington et al., "Braking Mechanisms," 11 pages.

Office Action, dated Aug. 22, 2017, for U.S. Appl. No. 14/464,255, Allington et al., "Braking Mechanisms," 5 pages.

Office Action, dated Feb. 20, 2018, for U.S. Appl. No. 14/464,255, Allington et al., "Braking Mechanisms," 15 pages.

Office Action, dated Jan. 17, 2018, for U.S. Appl. No. 15/586,111, Allington et al., "Braking Mechanisms," 15 pages.

(56) References Cited

OTHER PUBLICATIONS

Office Action, dated Jan. 9, 2014, for U.S. Appl. No. 13/255,625, Allington et al., "Braking Mechanisms," 9 pages.
Office Action, dated Jul. 25, 2016, for U.S. Appl. No. 14/464,255, Allington et al., "Braking Mechanisms," 10 pages.
Extended European Search Report, dated Jul. 11, 2017, for European Application No. 14872681.3-1809, 10 pages.

* cited by examiner

ENERGY ABSORBING APPARATUS

BACKGROUND

Technical Field

Described herein is an energy absorbing apparatus and methods of use. More specifically, apparatus and methods of use are described that utilize varying energy absorbing relationships between the apparatus members to absorb an energy input.

Description of the Related Art

Energy absorbing apparatus may take a variety of forms, the aim being in a broadest sense, to absorb and/or transfer an energy input by converting the energy in some different manner. One non-limiting example may be to disperse a torque force imposed on a shaft or coupling by transferring the torque force to heat energy, movement of another member, causing a change in gravitational energy, causing a mechanical deformation and so on.

For the purposes of the description below and for brevity, reference will be made to safety apparatus and in particular self-retracting lifelines (SRLs) however this should not be seen as limiting. Note that SRLs may also be termed fall limiters, personal fall limiters, yo-yos, road side barrier, road side barrier terminal end, and seatbelts.

SRLs are used in industrial safety applications to prevent falls from height. An SRL typically comprises an extendable and retractable line wound on a spool. The user connects one end of the line to their body, typically via a harness with a connection point. In the event of normal movement, the SRL allows the line to extend and retract. Should a line extension force occur beyond a predetermined rate, the SRL acts to slow and/or stop further line extension. The rapid line extension may be the result of a fall and the slow/stop property of the SRL acts to prevent injury to the user.

For an SRL to be effective, a sudden force generated by a line extension must be rapidly detected and the force absorbed/transferred quickly, and potentially reduced to full energy transfer (e.g. to a halt motion). Many art devices already exist, often utilizing latches or other mechanical interactions between the members to absorb the energy and slow/stop a fall. Potential problems with art SRL devices may be reliability, the art mechanisms utilized in the absorption of energy being susceptible to contamination, environmental decay, deformation, and wear that might be generated from the manufacturing process or use in the field. Such reliability issues demand onerous checking and servicing requirements, and the potential for further harm to users of such art devices. The apparatus described herein may address some of these potential problems or at least provides the public with a choice.

Further aspects and advantages of the energy absorbing apparatus and methods of use should become apparent from the ensuing description that is given by way of example only.

BRIEF SUMMARY

Described herein are apparatus and methods of use that utilize varying energy absorbing relationships between the apparatus members to absorb an energy input particularly via various metal forming processes.

In a first aspect, there is provided an energy absorbing apparatus comprising:

a first energy producing member;

a second energy absorbing member; and when an energy input is produced by the first energy producing member that exceeds a predetermined threshold, the second energy absorbing member absorbs at least part of the first member energy via a material forming process.

In a second aspect, there is provided a method of absorbing energy by the steps of:

(a) selecting an energy absorbing apparatus substantially as described above;

(b) applying an energy input on the first energy producing member that exceeds the predetermined threshold thereby triggering the second energy absorbing member to absorb at least part of the first member energy via a material forming process.

The inventors have established that material forming processes may provide useful ways of absorbing energy. The absorbing noted above may act as an arrest force, slowing or stopping movement of the first energy producing member.

Advantages of the above material forming processes may be varied depending on the final configuration but may include:

Rapid deployment of an absorbing force beyond a predetermined threshold;

Rapid absorbing/transfer from part to full energy transfer.

The apparatus described have an inherent reliability since they are mechanically simple and rely on known and predictable properties of the materials;

The sudden stop that might be generated from an art latch device can be avoided through material selection and design;

High density forces may be absorbed;

The energy absorbing member or parts thereof may be replaced post activation allowing the apparatus to be re-set post activation; and The energy absorbing member or parts thereof have a long deformable length (high strain capacity).

BRIEF DESCRIPTION OF THE SEVERAL VIEWS OF THE DRAWINGS

Further aspects of the energy absorbing apparatus and methods of use will become apparent from the following description that is given by way of example only and with reference to the accompanying drawings in which.

DETAILED DESCRIPTION

Figure 1:
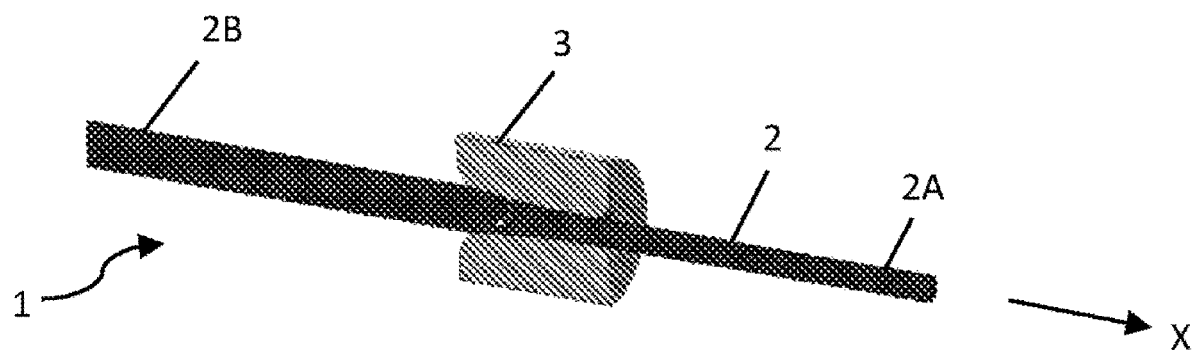
FIG. 1 illustrates an example of a wire drawing embodiment.

As noted above, described herein are apparatus and methods of use that utilize varying energy absorbing relationships between the apparatus members to absorb an energy input particularly via various metal forming processes.

For the purposes of this specification, the term 'about' or 'approximately' and grammatical variations thereof mean a quantity, level, degree, value, number, frequency, percentage, dimension, size, amount, weight or length that varies by as much as 30, 25, 20, 15, 10, 9, 8, 7, 6, 5, 4, 3, 2, or 1% to a reference quantity, level, degree, value, number, frequency, percentage, dimension, size, amount, weight or length.

The term 'substantially' or grammatical variations thereof refers to at least about 50%, for example 75%, 85%, 95% or 98%. The term 'comprise' and grammatical variations thereof shall have an inclusive meaning—i.e. that it will be taken to mean an inclusion of not only the listed components it directly references, but also other non-specified components or elements.

The terms 'rod', 'wire' and 'bar' may be used interchangeably. For brevity, the description below may refer to generally round or circular cross section rods, wires or bars however this should not be seen as limiting since other cross sections may be used and still achieve the same or similar function such as square, oblong or elliptical cross sections. Further, a rod, wire, bar, or similar may be referred to in the singular context, however it will be appreciated that the invention is possible with multiples of such elements in parallel to achieve the desired function and are therefore within the scope of the invention. These multiples may each be of different form, area, and material, to the others, selected to achieve the desired function and performance characteristic.

The term 'member' may refer to one part or element or multiple parts or elements that together achieve the function noted.

In a first aspect, there is provided a device comprising:
at least one moving mass;
at least one energy absorbing member; and
when the at least one moving mass reaches a predefined threshold, the at least one energy absorbing member engages and applies a retarding force on movement of the at least one moving mass, transferring kinetic energy from the at least one moving mass into work energy by plastic deformation of a material associated with the at least one energy absorbing member.

The inventors have established that material forming processes may provide useful ways of absorbing energy. The absorbing noted above may act as an arrest force, slowing or stopping movement of the first energy producing member.

The predefined threshold noted above may be a distance of movement of the moving mass and/or speed/rate of movement of the moving mass.

Engagement noted above may be by coupling of the at least one moving mass and the at least one energy absorbing member.

The retarding force may result in a halt in movement of the at least one moving mass although retarding may also refer to a slowing in speed or rate of movement and not a complete halt in movement.

Prior to engagement, the at least one moving mass may be free to move relative to the at least one energy absorbing member. For example the moving mass may be a spool of line that is free to rotate until the predetermined threshold, for example rapid deployment of line from the spool, at which point coupling and absorption occurs.

An external force may impose motion to the at least one moving mass.

The at least one moving mass may move in a linear direction and the retarding force applied to the at least one moving mass may be a linear force. Alternatively, the at least one moving mass rotates and the retarding force applied to the moving mass may be a torque force.

The retarding force may be applied in a direction substantially opposite that of the moving mass direction of travel.

The rate at which kinetic energy may be absorbed by the at least one energy absorbing member may be related to:
(a) the force or torque applied to the at least one energy absorbing member from the at least one moving mass; and/or
(b) the distance travelled or rotated by the at least one moving mass.

Plastic deformation as noted above may be achieved by methods selected from: wire drawing, deep drawing, tube inversion, and combinations thereof.

Wire drawing is an industrial process where a wire or bar may be reduced in diameter by pulling the bar through a reduced diameter member such as a die with a narrowing waist or shoulder.

Deep drawing or tube inversion are processes are similar in style to wire drawing, that is metal being drawn through a die however, deep drawing refers to drawing a plate and tube inversion is drawing a tube. These processes may be adapted in a similar style as noted above for energy absorbing apparatus as described above.

The wire, sheet or tube used in the methods above may have substantially uniform material characteristics resulting in a substantially linear retarding force being applied to the at least one moving mass.

The term 'uniform characteristics' used above refers to reaching a substantially constant retarding force but optionally including at least one limited duration variation in retarding force e.g. at the time of engagement allowing for an initial increase in retarding force imposition.

Alternatively, the wire, sheet or tube used may have non-uniform material characteristics resulting in a non-linear retarding force being applied to the at least one moving mass.

The material characteristics may be varied along part or all of the wire length, the characteristics being selected from alterations to the: wire/sheet/tube diameter or width, wire/sheet/tube composition, wire/sheet/tube material treatments prior to forming; and combinations thereof.

The force required to pull the wire/sheet/tube through the die may be predictable and is related to the strain energy required to deform the material within the die. Through choice of material, the force required to pull the wire through the die may be tuned. This process may also be capable of absorbing high energy density forces. This may be because:
The entire volume of the material is strained as it passes through the die;
The material being worked is confined within the die and is subject to hydrostatic compression forces so high stresses can be sustained;
The material being deformed may be of high strength, so that a significant amount of strain energy can be generated from a small volume of material.

As noted above, the arrest force profile, being the rate of line speed extension slowing or stopping, may be modulated by pre-forming the wire. For example, the section of wire that initially enters the die may be tapered from a fully formed diameter to an un-formed diameter over a finite length. In addition, the force required to draw the wire through the die may be modulated through for example use of varying materials, use of varying diameters, material treatments prior to forming and the like. As a result of the above variations, the torque exerted on the first energy causing member (e.g. a spool) can be controlled in either a linear or non-linear manner depending on various predetermined aspects.

In an alternative embodiment, plastic deformation may be by methods selected from: bar bending or controlled buckling where a wire, rod, bar or plate bends or buckles in a predetermined manner to absorb kinetic energy and impose the retarding force. In a rotational embodiment, bending or buckling may be torsional deformation through the act of twisting a wire, rod or bar.

The wire, rod, bar or plate may have substantially uniform material characteristics resulting in a substantially uniform retarding force being applied to the moving mass.

Alternatively, the wire, rod, bar or plate may have non-uniform material characteristics resulting in a non-linear retarding force or forces being applied to the moving mass.

The non-uniform characteristics may comprise multiple layers of material, the layers having differing deformation moduli therefore providing varying energy absorbing characteristics.

Alternatively, the material forming process may be bar bending or controlled buckling. In these embodiments, a wire, rod, bar or plate may bend or buckle in a predetermined manner when a first member force is applied over a predetermined level. In a further form, this may be bending in the rotational sense, commonly referred to as torsional deformation through the act of twisting a wire, rod or bar. The degree of material strain may govern the rate of energy absorbing. In this embodiment, the amount of strain may vary through the thickness of the material and as a result, the degree of energy absorbing may be tuned. For example, multiple layers of material may be used, the materials having differing moduli of elasticity therefore providing varying energy absorbing characteristics.

In a further alternative embodiment, plastic deformation may be by slitting or shearing where a wire or bar is slit or sheared through to absorb kinetic energy and impose the retarding force. In this embodiment a wire, rod or bar may be slit or sheared through in the event of a predetermined force being imposed on the second energy absorbing member.

In a further embodiment, plastic deformation may be by extrusion using a material that re-crystallizes at room temperature. Further, plastic deformation may be by extrusion using a material that becomes deformable under energy loading. In both of these embodiments, the methods alone or together absorb kinetic energy and impose the retarding force. The material used for deformation may depend on whether the embodied item is a single use device or multiple use device. Single use devices may use materials that permanently deform, examples including metals or metal alloys and/or plastics. If the intention is to design a multi-use device, then having a material that has properties that remain unchanged or return to an original position post deformation (via a material memory for example) may be useful. Examples of multi-use materials may include rubber, gels or metals that re-crystalize. In one embodiment, the material may be lead or lead alloy.

The material may be formed as a wire with a bulged element that passes through a confined volume relative to the extrudable material shape and size. In a linear motion embodiment, the bulged portion may be a rod enclosed within a housing and when relative movement occurs between rod and housing, the bulged portion is forced into a more confined region of the housing. Alternatively, in a rotational motion embodiment, the bulged portion is formed inside a housing, the housing being formed from co-rotating, different speed elements or counter rotating elements and a circular opening between the rotating elements in which the extrudable material is housed; and wherein when relative rotation occurs between the elements, the extrudable material is forced into a more confined spacing causing material forming to occur and retarding relative motion between the elements.

In a further embodiment, plastic deformation may be by friction welding. Friction welding may be achieved for example whereby the at least one moving mass is a rotating bar that may engage a stationary reaction bar acting as the energy absorbing member via axial loading and, when the mass and member meet, friction between the two surfaces caused by axial loading results in sufficient heat to weld the two components together and the retarding force is achieved by adhesion of the absorbing member during the welding process. The rate of retarding force applied to the moving mass may be substantially uniform. Alternatively, the rate of retarding force applied to the at least one moving mass may be non-uniform achieved by varying the materials used and the rate of the at least one moving mass movement or the applied level of axial load. In an SRL embodiment for example, the fall detection mechanism may activate axial loading of the welded components by triggering the application of a spring force. This embodiment may be useful in order to allow easy resetting of the SRL—for example by removing and replacing the welded components after the fall event.

In a second aspect, there is provided a method of absorbing energy by the steps of:

(a) selecting a device substantially as described above;

(b) applying a motion causing energy input on the at least one moving mass that exceeds the predefined threshold thereby triggering the at least one energy absorbing member to absorb at least part of the at least one moving mass kinetic energy via a material forming process.

Final embodiments for the device described herein may be varied. For example, an autobelay or self-retracting lifeline (SRL) embodiment may use the energy absorbing mechanisms. In an SRL embodiment, a line may extend and retract from the SRL device and when the line extends from the SRL device at a rate beyond a predefined threshold, the energy absorbing member engages and applies a retarding force on the rate of line extension, transferring kinetic energy from the line into work energy by plastic deformation of a material associated with the energy absorbing member. SRL and autobelay applications should not be seen as limiting since the devices described may be used for a wide variety of other applications, non-limiting examples including speed control or load control of:

a rotor in a rotary turbine;
exercise equipment e.g. rowing machines, epicyclic trainers, weight training equipment;
roller-coasters and other amusement rides;
Elevator and escalator systems;
evacuation descenders and fire escape devices;
conveyer systems:
rotary drives in factory production facilities;
materials handling devices such as conveyer belts or a braking device in a chute;
roadside safety systems e.g. the energy absorber may be connected in a system to provide crash attenuation though the dissipation of energy via the energy absorber e.g. a roadside barrier or roadside barrier terminal end;
seat belts in vehicles;
zip lines;
braking mechanisms for trolleys and carriages;
Bumpstops in transport applications;
Bumpstops in crane applications;

Torque or force limiting devices in mechanical drive train;
Structural overload protection in wind turbines;
Load limiting and energy dissipation in structures, buildings and bridges.

Advantages of the above material forming processes may be varied depending on the final configuration but may include:

Rapid deployment of an absorbing force beyond a predetermined threshold;
Rapid absorbing/transfer from part to full transfer.
The apparatus described have an inherent reliability since they are mechanically simple and rely on known and predictable properties of the materials;
The sudden stop that might be generated from an art latch device can be avoided through material selection and design;
High density forces may be absorbed; and
The energy absorbing member or parts thereof may be replaced post activation allowing the apparatus to be re-set post activation.

The embodiments described above may also be said broadly to consist in the parts, elements and features referred to or indicated in the specification of the application, individually or collectively, and any or all combinations of any two or more said parts, elements or features.

Further, where specific integers are mentioned herein which have known equivalents in the art to which the embodiments relate, such known equivalents are deemed to be incorporated herein as of individually set forth.

Working Examples

The above described energy absorbing apparatus and methods of use are now described by reference to specific examples.

Example 1

FIG. 1 shows the principle of wire drawing. The energy absorbing member generally indicated by arrow 1 may be a wire or rod 2 of a varying diameter 2A, 2B. The wire 2 passes through a waisted die 3 in direction X when an energy input is imposed on the wire 2, and in doing so, wire 2 drawing occurs through the waisted die 3 causing the wire 2 to deform by a reduction in diameter through the die 3. This reduction in area through the deformation of the wire absorbs energy.

Example 2

Figure 2:
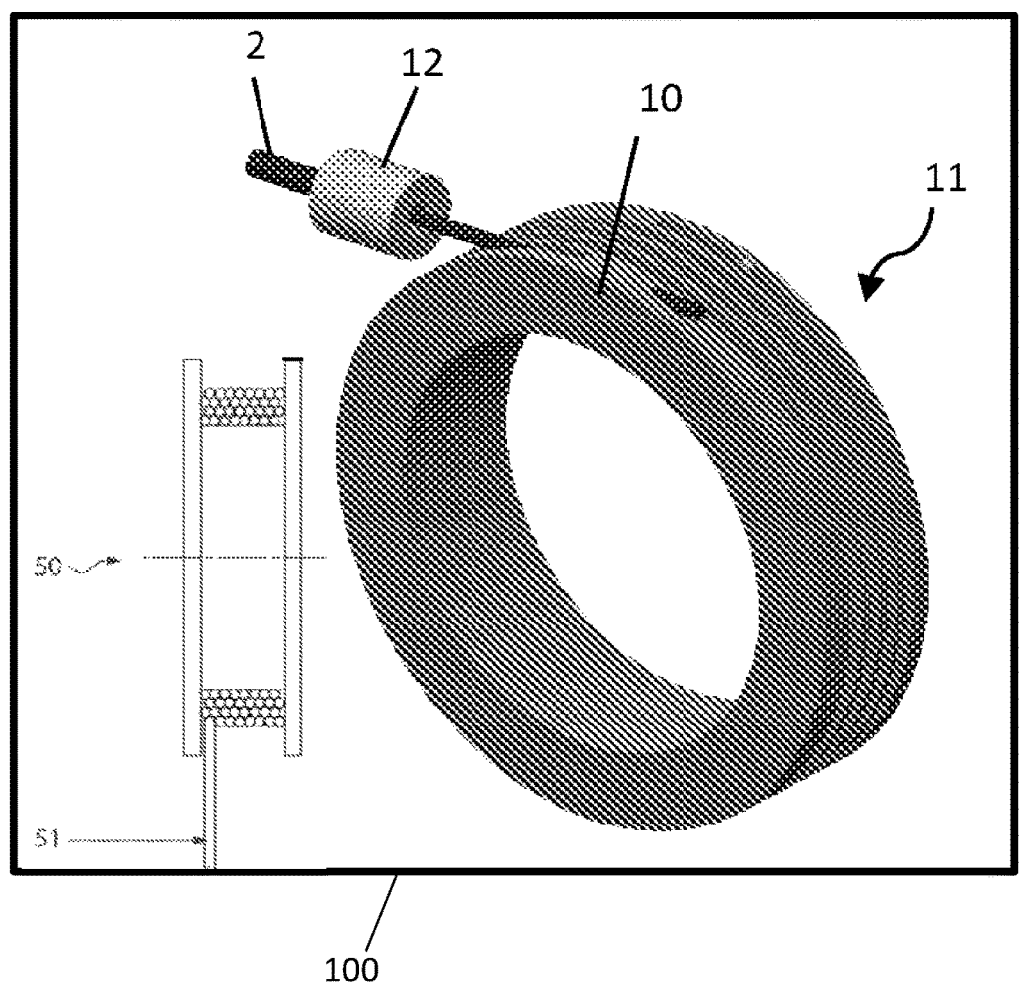
FIG. 2 illustrates a potential SRL embodiment utilizing wire drawing.

FIG. 2 shows an SRL embodiment 100 with the wire or bar 2 noted in Example 1 attached to the rim 10 of a disc 11 that is normally stationary during the extension/retraction operation of a spool 50 on which a line 51 is attached. If a fall occurs, the rapid rate of increase in line extension (the first energy producing member) causes movement of the spool 50. An activation mechanism connects the spool 50 to the disc 11 (the second energy absorbing member), causing the disc 11 to spin and in turn drawing the wire 2 through the die 12. The resulting material forming process absorbs the fall energy and thereby slows (or stops) pay out of the line 51.

Example 3

Figure 3:
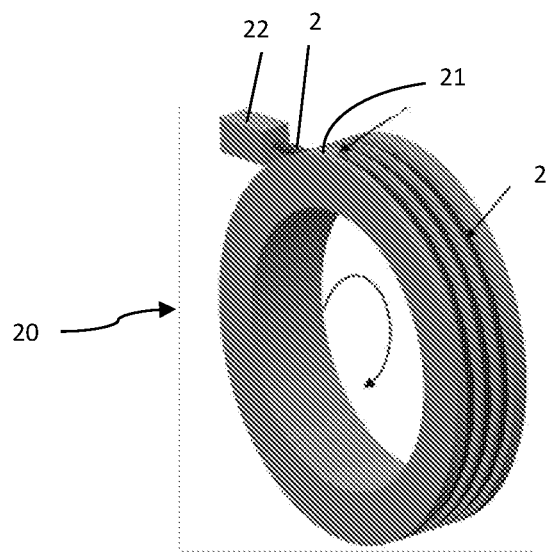
FIG. 3 illustrates an alternative potential SRL embodiment utilizing wire drawing.

Alternatively, as shown in FIG. 3, the SRL may have a rotating disc 20 and the die 21 forms part of/is integrated into the rotating disc 20. The unformed wire 2 is coiled around the disc 20 and a free end is anchored to an SRL housing 22. When an energy input is applied to the rotating disc 20 beyond the predetermined level, the wire 2 is forced through the die 21 thereby causing material forming to occur.

Example 4

Figure 4:
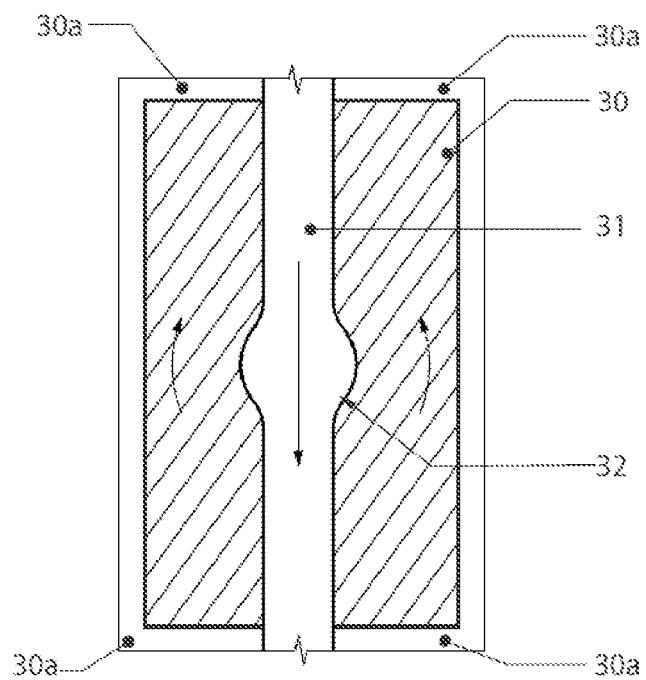
FIG. 4 illustrates a linear motion extrusion embodiment.

Metal forming may instead be completed via extrusion. FIG. 4 illustrates an extrusion embodiment using a first energy producing member 30, supported in a housing 30a. The housing 30a and first energy producing member 30 encloses a second energy absorbing member 31, in FIG. 4 shown as an elongated rod with a bulge 32 region. The first energy absorbing member 30 may be manufactured from a malleable material such as lead.

An energy input may be produced by the housing 30a moving when subject to an applied force. When this input is below a predetermined threshold, the energy absorbing member 30 does not deform and hence prevents movement of the housing 30a about the bulge 32 region. Should the energy input exceed a predetermined threshold, the first energy absorbing member 30—the lead—deforms about the bulge 32. This forces the bulge 32 material into a more confined space within the housing 30a and in doing so, absorbs at least part of the first member 30 and housing 30a energy via a material forming process.

Example 5

Figure 5:
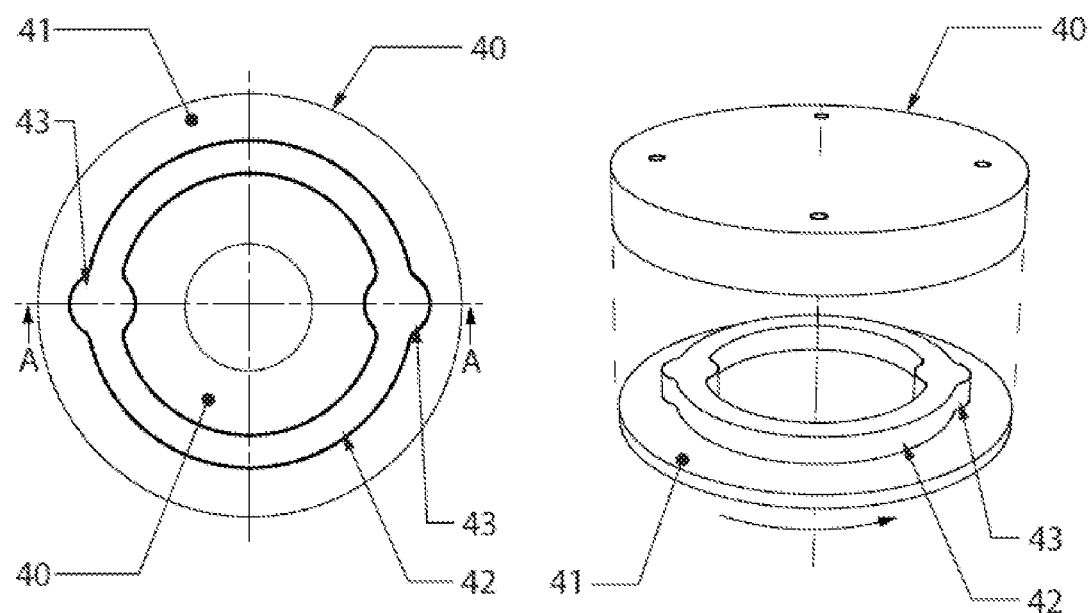
FIG. 5 illustrates a rotational motion extrusion embodiment.

FIG. 5 shows an alternative extrusion embodiment to Example 4. Example 4 and FIG. 4 above illustrate a linear or generally linear movement direction of the housing 30. A rotational approach may instead be used as shown in FIG. 5 using a first energy producing member 41 supported within a housing 40. The housing 40 and first energy producing member 41 enclose a second energy absorbing member 42, in FIG. 5 shown as an annulus with two bulge portions 43 about the circumference. The energy absorbing member 42 may be made from a malleable material such as lead. An energy input may be produced by the housing 40 rotating when subject to an applied force. When this input is below a predetermined threshold, the first energy absorbing member 42 does not deform and hence prevents movement of the housing 40. If the energy input exceeds a predetermined threshold, the first energy absorbing member 42 deforms about the bulges 43. This forces the bulge 43 material into a more confined space within the housing 40 and in doing so, absorbs at least part of the first member 41 and housing 40 energy via a material forming process.

Example 6

Figure 6:
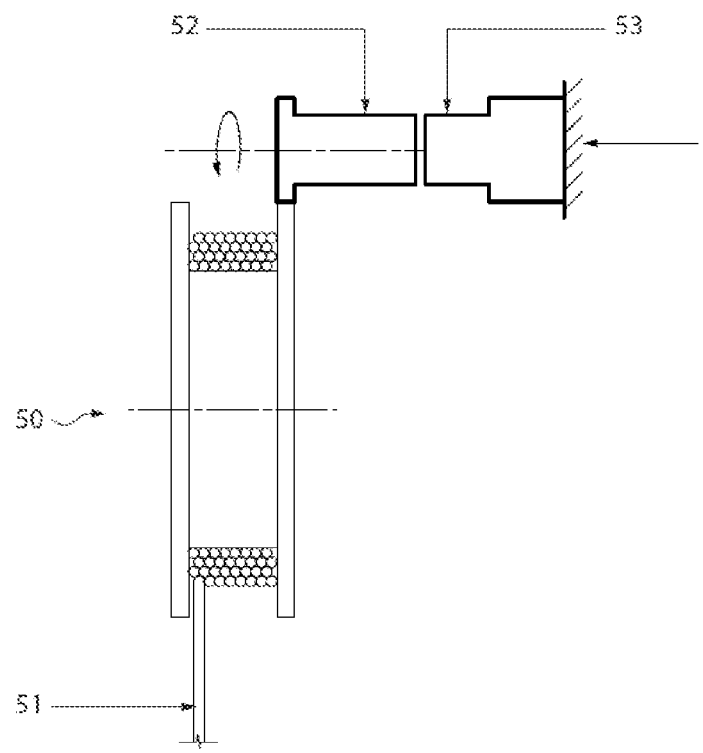
FIG. 6 illustrates a friction welding embodiment.

Alternatively, the material forming process may be via friction welding. FIG. 6 illustrates one means for achieving metal forming. As shown in FIG. 6, a spool 50 (the first energy producing member) with extendable line 51 on it, is linked to a rotating bar 52 axially aligned with a stationary bar 53, the rotating bar 52 and stationary bar 53 being the energy absorbing member.

In normal operation the rotating bar 52 and stationary bar 53 are not connected. In the event of a predetermined threshold being reached, the rotating bar 52 is axially loaded against the stationary bar 53 by axial movement of the stationary bar 53 or rotating bar 52. When the rotating bar 52 and stationary bar 53 surfaces meet, the friction between the two surfaces may, through material selection, rate of member 52, 53 movement and so on, result in sufficient heat to weld the two components 52, 53 together. As welding occurs, the rotating component 52 will experience a braking force caused by adhesion to the stationary component 53, energy therefore being absorbed during the welding process. In an SRL embodiment, the fall detection mechanism may activate axial loading of the components 52, 53, for example, by triggering the axial movement via a spring force. Post welding, the components 52, 53 may be removed and replaced with new separate parts 52, 53.

Aspects of the energy absorbing apparatus and methods of use have been described by way of example only and it should be appreciated that modifications and additions may be made thereto without departing from the scope of the claims herein.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A self-retracting lifeline device, comprising:
    a line having a first end that extends and retracts from the self-retracting lifeline device, and an opposing end of the line coupled to at least one energy absorbing member,
    wherein, when the first end of the line extends from the self-retracting lifeline device at a rate below a predefined threshold, the first end of the line is free to move relative to the at least one energy absorbing member, and when the first end of the line extends from the self-retracting lifeline device at a rate beyond the predefined threshold, the at least one energy absorbing member engages the line and applies a retarding force on the rate of extension of the line, transferring kinetic energy from the line into work energy by wire drawing of the at least one energy absorbing member, such that a wire is plastically deformed to a reduced diameter during the wire drawing by pulling the wire through a reduced diameter member having a narrowing waist or shoulder.

2. The self-retracting lifeline device as claimed in claim 1 wherein the retarding force results in a halt in movement of the first end of the line.

3. The self-retracting lifeline device as claimed in claim 1 wherein an external force imposes motion to the first end of the line.

4. The self-retracting lifeline device as claimed in claim 1 wherein the first end of the line moves in a linear direction and the retarding force applied to the first end of the line is a linear force.

5. The self-retracting lifeline device as claimed in claim 1 wherein the first end of the line rotates and the retarding force applied to the first end of the line applies a torque to the first end of the line.

6. The self-retracting lifeline device as claimed in claim 1 wherein the retarding force is applied in a direction substantially opposite a direction of travel of the first end of the line.

7. The self-retracting lifeline device as claimed in claim 1 wherein a rate at which kinetic energy is absorbed by the at least one energy absorbing member is related to:
    a force or torque applied to the at least one energy absorbing member by the line; and/or
    a distance traveled or rotated by the first end of the line.

8. The self-retracting lifeline device as claimed in claim 1 wherein the at least one energy absorbing member has substantially uniform material characteristics resulting in a substantially linear retarding force being applied to the first end of the line.

9. The self-retracting lifeline device as claimed in claim 1 wherein the at least one energy absorbing member has non-uniform material characteristics resulting in a non-linear retarding force being applied to the first end of the line.

10. The self-retracting lifeline device as claimed in claim 9 wherein the material characteristics are varied along part or all of a length of the at least one energy absorbing member and the material characteristics are selected from a group consisting of: wire diameter, wire composition, wire material treatments prior to forming, and combinations thereof.

11. The self-retracting lifeline device as claimed in claim 1 wherein the at least one energy absorbing member is made of lead or a lead alloy.

12. The self-retracting lifeline device as claimed in claim 1 wherein the at least one energy absorbing member includes a bulged element that passes through a confined volume relative to the extrudable material shape and size.

13. The self-retracting lifeline device as claimed in claim 12 wherein the bulged element is enclosed within a housing and when relative movement occurs between the at least one energy absorbing member and the housing, the bulged element is forced into a more confined region of the housing.

14. The self-retracting lifeline device as claimed in claim 1 wherein a rate at which the retarding force is applied to the first end of the line is substantially uniform.

15. The self-retracting lifeline device as claimed in claim 1 wherein a rate at which the retarding force is applied to the first end of the line is non-uniform, the non-uniform rate achieved by varying materials used and a rate of movement of the first end of the line.

16. A method of absorbing energy using a self-retracting lifeline device comprising:
    a line having a first end that extends and retracts from the self-retracting lifeline device, and an opposing end of the line coupled to at least one energy absorbing member,
    wherein, when the first end of the line extends from the self-retracting lifeline device at a rate below a predefined threshold, the first end of the line is free to move relative to the at least one energy absorbing member, and when the first end of the line extends from the self-retracting lifeline device at a rate beyond the predefined threshold, the at least one energy absorbing member engages the line and applies a retarding force on the rate of extension of the line, transferring kinetic energy from the line into work energy by wire drawing of the at least one energy absorbing member,
    the method comprising:
    applying a motion causing energy input on the first end of the line that exceeds the predefined threshold thereby triggering the at least one energy absorbing member to absorb at least part of a kinetic energy of the first end of the line by a wire drawing process, such that a wire is plastically deformed to a reduced diameter during the wire drawing by pulling the wire through a reduced diameter member having a narrowing waist or shoulder.

* * * * *